United States Patent
Kim et al.

(10) Patent No.: US 6,512,931 B1
(45) Date of Patent: Jan. 28, 2003

(54) POWER CONTROL DEVICE AND METHOD FOR REVERSE LINK COMMON CHANNEL IN MOBILE COMMUNICATION SYSTEM

(75) Inventors: Young-Ky Kim, Seoul (KR); Jae-Min Ahn, Seoul (KR); Chang-Soo Park, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/352,233

(22) Filed: Jul. 13, 1999

(30) Foreign Application Priority Data

Jul. 13, 1998 (KR) ............................................. 98-28238
Aug. 5, 1998 (KR) ............................................. 98-32351

(51) Int. Cl.[7] .............................. H04B 7/00; H04Q 7/20
(52) U.S. Cl. ........................ 455/522; 455/69; 370/318; 370/335
(58) Field of Search ....................... 455/423, 67.1–67.4, 455/522, 68, 69; 370/318, 320, 329, 335, 311, 342, 441

(56) References Cited

U.S. PATENT DOCUMENTS

| | | | |
|---|---|---|---|
| 6,072,784 A | * | 6/2000 | Agrawal et al. ............ 370/311 |
| 6,216,004 B1 | * | 4/2001 | Tiedemann, Jr. et al. ... 455/442 |
| 6,252,865 B1 | * | 6/2001 | Walton et al. .............. 370/335 |
| 6,308,080 B1 | * | 10/2001 | Burt et al. .................. 455/522 |
| 6,311,070 B1 | * | 10/2001 | Tong et al. ................. 455/522 |
| 6,343,218 B1 | * | 1/2002 | Kaneda et al. .............. 455/522 |

* cited by examiner

Primary Examiner—Thanh Cong Le
Assistant Examiner—Tuan Tran
(74) Attorney, Agent, or Firm—Dilworth & Barrese, LLP

(57) ABSTRACT

A method for controlling the transmission power of the reverse common channel for a mobile station in a CDMA communication system. In the method, the mobile station transmits a preamble signal at predetermined periods with increasing transmission power. Upon receipt of an acknowledge signal from a base station, the mobile station accesses the reverse common channel. In order to avoid multiple mobile stations from simultaneously generating increasingly powerful and interfering transmissions, the method generates two transmission power control signals: one based on the measured strength of a signal received from the base station and the other based on an accumulated value of power control commands transmitted by the base station. These two signals are accumulated and used to control the preamble signal.

13 Claims, 5 Drawing Sheets

POWER CONTROL DEVICE AND METHOD FOR REVERSE LINK COMMON CHANNEL IN MOBILE COMMUNICATION SYSTEM

PRIORITY

This application claims priority to an application entitled "Power Control Device and Method for Reverse Link Common Channel in Mobile Communication System" filed in the Korean Industrial Property Office on Jul. 13, 1998 and assigned Ser. No. 98-28238, and an application "Power Control Device and Method for Reverse Link Common Channel in Mobile Communication System" filed in the Korean Industrial Property Office on Aug. 5, 1998 and assigned Ser. No. 98-32351, the contents of which are hereby incorporated by reference.

BACKGROUND OF THE INVENTION

1. Field of the Invention

The present invention relates generally to a power control device and method for a mobile communication system, and in particular, to a power control device and method for a reverse link common channel.

2. Description of the Related Art

In general, an existing code division multiple access (CDMA) mobile communication system is based on the IS-95 standard which mainly supports a voice service. However, in the near future, mobile communication will be performed in accordance with the IMT-2000 standard which supports not only the voice service but also a high-speed data transfer service. For example, the IMT-2000 standard can support a high-quality voice service, a moving picture service, an Internet search service, etc.

In the CDMA mobile communication system, a radio link between a base station and a mobile station is divided into a forward link for transmitting a signal from the base station to the mobile station and a reverse link for transmitting a signal from the mobile station to the base station.

Reverse (link) common channels include a reverse common control channel (R-CCCH) and a reverse access channel (R-ACH). The reverse common control channel and the reverse access channel undergo power adjustment by the exchange of a message and an acknowledge signal (ACK) between a base station and a mobile station, but do not undergo fast closed-loop power control which will be described below.

A description will be made hereinbelow regarding a conventional power control method for a reverse common control channel and a reverse access channel.

The power control method is divided into an open-loop power control method and a closed-loop power control method. In the open-loop power control method, a mobile station measures the strength of a signal received over the forward link and compares the measured value with a threshold. When the strength of the received signal is smaller than the threshold, the mobile station increases transmission power; otherwise, when the strength of the received signal is greater than the threshold, the mobile station decreases the transmission power.

In the closed-loop power control method, a mobile station transmits a message to a base station over a reverse link and then determines whether or not an acknowledge signal (ACK) is received from the base station. Upon failure to receive the acknowledge signal, the mobile station transmits the message again with transmission power increased by a predetermined level so as to access the base station.

The reverse common control channel and the reverse access channel are contention-based channels. When multiple mobile stations simultaneously attempt to access a base station through the channels, contention may occur between them. In this case, the respective mobile stations again attempt to access the base station with increased power, causing an increase in interference between the reverse links of the mobile communication system. This results in performance degradation of other mobile station's channel qualities. This problem will become clearer in the following descriptions.

FIG. 1 illustrates a conventional power control method for the reverse link common channel. Referring to FIG. 1, a mobile station sends a preamble signal to a base station with minimum power in an attempt to access a base station. In FIG. 1, $T_1$ denotes the time when the first attempt to access the base station is made. When it fails to access the base station because of contention with other mobile stations, the mobile station waits for a predetermined time, and then, at time $T_2$, again attempts to access the base station by increasing the transmission power. When it fails to access the base station again, the mobile station waits for a predetermined time again, and then, at time $T_3$ attempts to access the base station with a further increase in transmission power. Here, the predetermined time is the sum of a fixed time and a random time.

In this case, contention occurring among multiple mobile stations may cause an increase in interference of the overall system due to the overly increased transmission power. Therefore, when packet data is transmitted over a reverse common control channel, this excessive transmission power problem may occur. Accordingly, there is a need for a fast power control method that suppresses excessive transmission power.

In general, a power control method for the reverse traffic channel aims at maintaining a signal-to-noise ratio ($E_b/N_o$) for a signal received from a base station. However, in a power control method for the reverse common channel, multiple mobile stations are controlled by one power control command stream, thus reducing the excessive reverse transmission power.

SUMMARY OF THE INVENTION

It is an object of the present invention to provide a power control device and method for reducing the excessive signal power of a reverse common channel in a mobile communication system.

It is another object of the present invention to provide a device and method for controlling transmission power of a reverse common channel using both open-loop power control and closed-loop power control in a mobile communication system.

To achieve the above and other objects, there is provided a method for controlling the transmission power of a reverse common channel for a mobile station in a CDMA communication system. In this method, the mobile station transmits a preamble signal at predetermined intervals, increasing the transmission power each time, until receipt of an acknowledge signal from a base station, at which time the mobile station accesses the reverse common channel. The method comprises the following steps: measuring the strength of a received signal to generate a first transmission power control signal for the preamble signal; accumulating power control commands received for a predetermined time over a forward common channel to generate an accumulated value, comparing the accumulated value with a threshold, and generating a second transmission power control signal for decreasing transmission power when it is required to decrease the transmission power, and maintaining a present transmission power when it is required to increase the transmission power; and accumulating the first and second transmission power control signals and controlling the preamble signal according to the accumulated transmission power control signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings.

The term "power control bit" (PCB) as used herein refers to a control bit which is transmitted to command the other party to increase or decrease transmission power, in order to control transmission power of the other party.

In an embodiment of the present invention, an open-loop power control method and a closed-power control method are used together in order to control the power of a reverse link common channel. Preferably, the reverse link common channel is used for the exchange of layer 3 and MAC (Medium Access Control) messages between a base station and a mobile station in a CDMA mobile communication system. When using the open-loop power control method, the power of the reverse link common channel is controlled according to the strength of a received signal. When using the closed-loop power control method, the power of the reverse link common channel is controlled by a power control signal transmitted from the base station. If the power control signal is a power-down command, the transmission power of the common channel is decreased; otherwise, the present transmission power is maintained. In this manner, interference due to excessive signal power of the reverse common channel is reduced.

Figure 2:
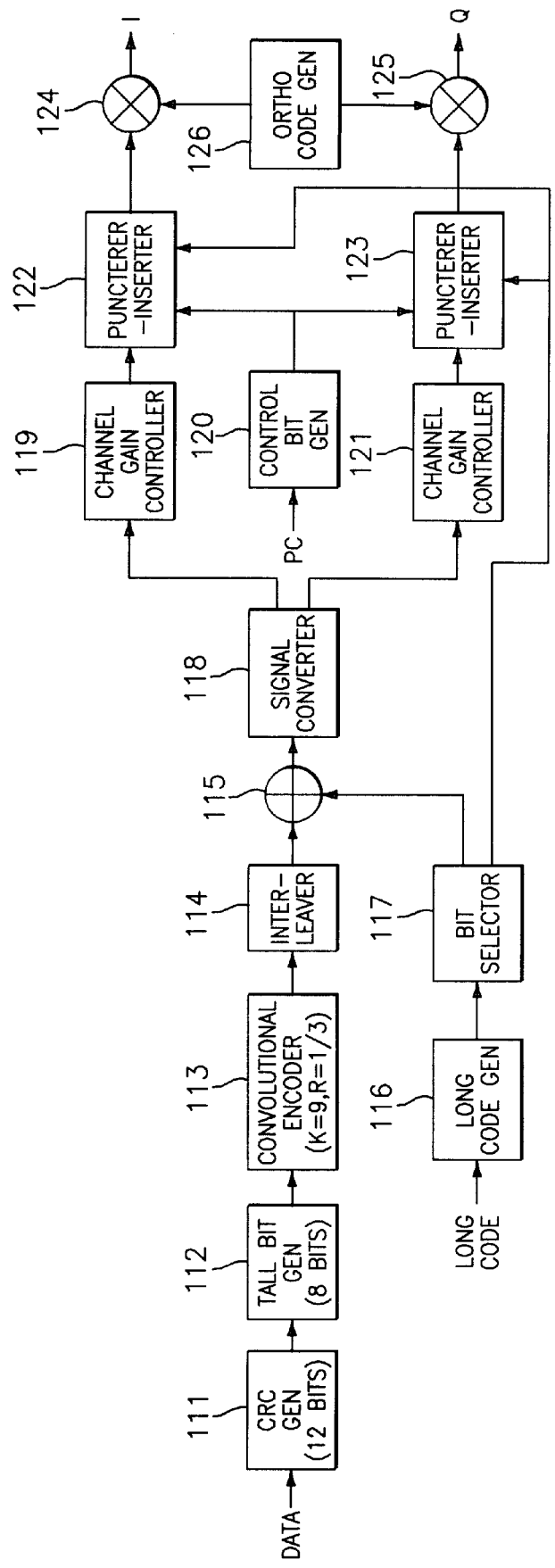
FIG. 2 is a block diagram illustrating a channel transmission device for a CDMA mobile communication system.

FIG. 2 illustrates a channel transmission device for a CDMA communication system. For convenient explanation, it is assumed herein that the input data is a 20 ms frame of data at full rate.

Referring to FIG. 2, a 172-bit data frame is input to a Cyclic Redundancy Code (CRC) generator 111 which adds a 12-bit CRC. The output of the CRC generator 111 is input to a tail bit generator 112 which generates 8 tail bits to add to the terminating point of the frame data in order that an encoder 113 can initialize data in a frame unit. Therefore, for the 172-bit input data, the tail bit generator 112 outputs 192-bit data. The encoder 113 then encodes frame data output from the tail bit generator 112 into 576 symbols per frame, and an interleaver 114 interleaves the encoded data output from the encoder 113.

A bit selector 117 decimates a long code output from a long code generator 116 to match a length of the long code to the length of the interleaved encoded data. An exclusive OR (XOR) gate 115 XORs the interleaved encoded data and the decimated long code to scramble the interleaved encoded data. Next, a signal convertor 118 multiplexes the output of the exclusive OR gate 115 to output odd-numbered data to a first channel (i.e., I-channel) and even-numbered data to a second channel (i.e., Q-channel), wherein the output signals are level converted in such a manner that a signal "0" is converted to "+1" and a signal "1" to "−1". The level-converted signals for I and to Q channels are gain controlled by channel gain controllers 119 and 121, respectively.

A control bit generator 120 generates a control bit to be inserted in the reverse common channel. A puncturer-inserter 122 and a puncturer-inserter 123 insert the control bit output from the control bit generator 120 in output data of the channel gain controllers 119 and 121 at a location designated by the bit selector 117. A multiplier 124 multiplies an output of the puncturer-inserter 122 by an assigned Walsh code to generate a spread I-channel signal, and a multiplier 125 multiplies an output of the puncturer-inserter 123 by the assigned Walsh code to generate a spread Q-channel signal.

Figure 5:
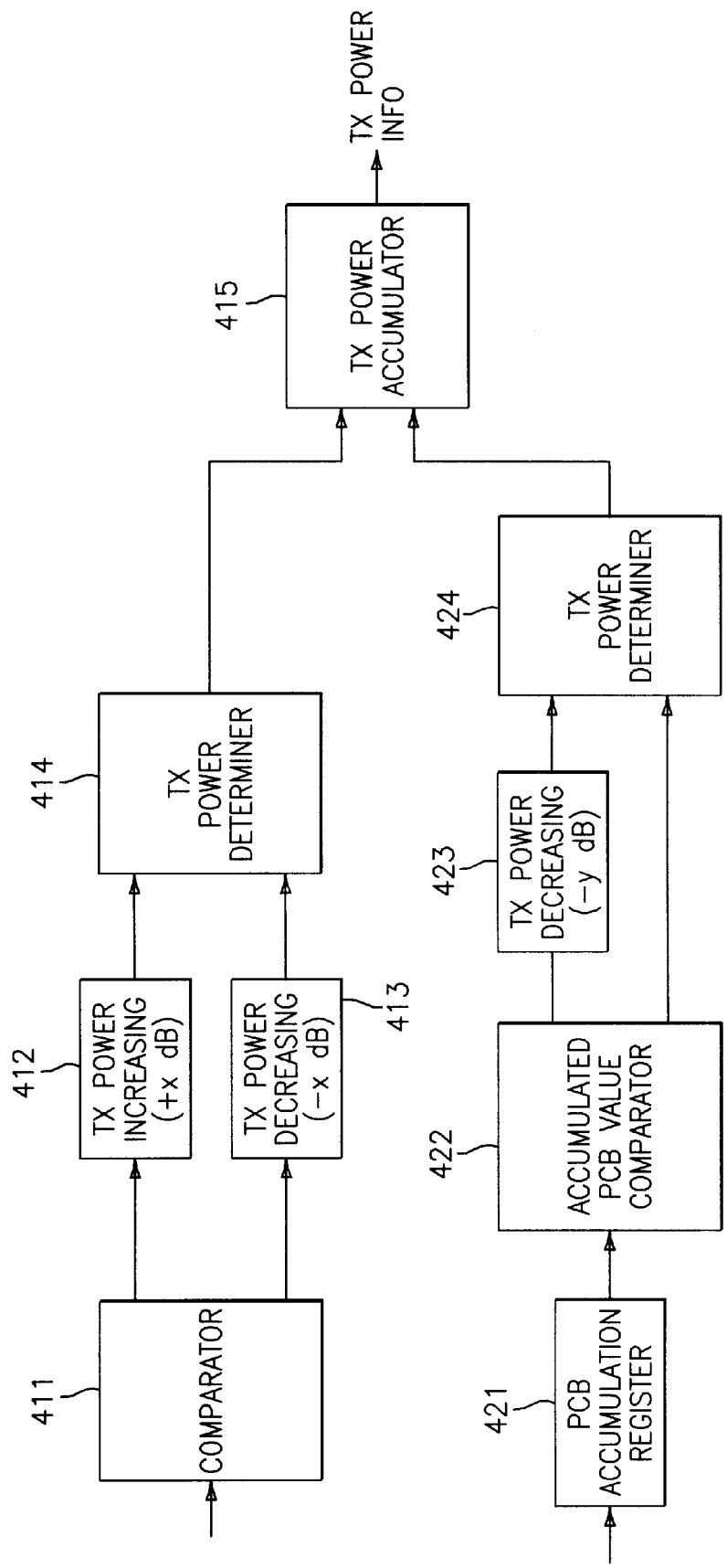
FIG. 5 is a block diagram illustrating a power control determiner according to an embodiment of the present invention.

FIG. 5 illustrates a power control determiner for controlling power of a reverse common channel according to an embodiment of the present invention. This power control method for a reverse common channel uses a mix of (1) the power control method of FIG. 1, for increasing transmission power at predetermined time periods until access to a base station is made, (2) an open-loop power control method for measuring the strength of a received signal to control transmission power, and (3) a fast closed-loop power control method for controlling transmission power using a power control command. Herein, a detailed description of the power control method of FIG. 1 will be avoided. Instead, the description will be made focusing on the open-loop power control method and the fast closed-loop power control method.

Referring to FIG. 5, a measured power level comparator 411 compares signal strength transmitted from a base station with a threshold and generates a comparison to result to determine how to control the transmission power of the reverse common channel. When the strength of the received signal is greater than the threshold, a transmission power decreasing device 413 is enabled; otherwise, when the strength of the received signal is smaller than the threshold, the comparator 411 enables a transmission power increasing device 412. A first transmission power determiner 414 then analyzes the outputs of the transmission power increasing device 412 and the transmission power decreasing device 413, to generate an open-loop power control signal.

The elements 411–414 constitute an open-loop power controller which increases or decreases transmission power of the reverse common channel according to the strength of the received signal.

Next, a PCB accumulation register 421 accumulates PCBs received from the base station. An accumulated PCB value comparator 422 compares the accumulated PCB value output from the PCB accumulation register 421 with an internal maximum value and generates a comparison result. As the result of the comparison, when it is required to decrease transmission power, the comparator 422 enables a transmission power decreasing device 423. However, when it is required to increase the transmission power, the transmission power of the reverse common channel remains unchanged at the present transmission power level. A second transmission power determiner 424 then analyzes outputs of the transmission power decreasing device 423 and the comparator 422, to generate a closed-loop power control signal.

The elements 421–424 constitute a closed-loop power controller, which analyzes an accumulated PCB value to decrease the transmission power of the reverse common channel only when it is required to decrease the transmission power and to maintain the present transmission power of the reverse common channel when it is required to increase the transmission power. With respect to the closed-loop power control, the maximum value compared with the accumulated PCB value is a system parameter which can be determined through experiments, and is the maximum value permitted when transmission power is increased by the fast close-loop power control. Further, for the fast closed-loop power control, a base station may send a power control command on the basis of a mobile station with the highest transmission power out of multiple mobile stations which attempt to access the base station. Therefore, when the transmission power of the mobile station which attempts to access the base station with the highest transmission power is reduced in a large amount, the mobile stations which attempt to access the base station with lower transmission power may fail to access the base station.

A transmission power accumulator 415 accumulates the open-loop power control signal and the closed-loop power control signal output from the transmission power determiners 414 and 424, to output a transmission power control signal. The transmission power control signal output from the transmission power accumulator 415 depends on both the strength of the received signal and the analyzed result of the PCBs transmitted from the base station. This transmission power control signal is accumulated again with a power control signal generated in the power control method of FIG. 1, and then used as a transmission power control signal for a preamble signal.

Figure 1:
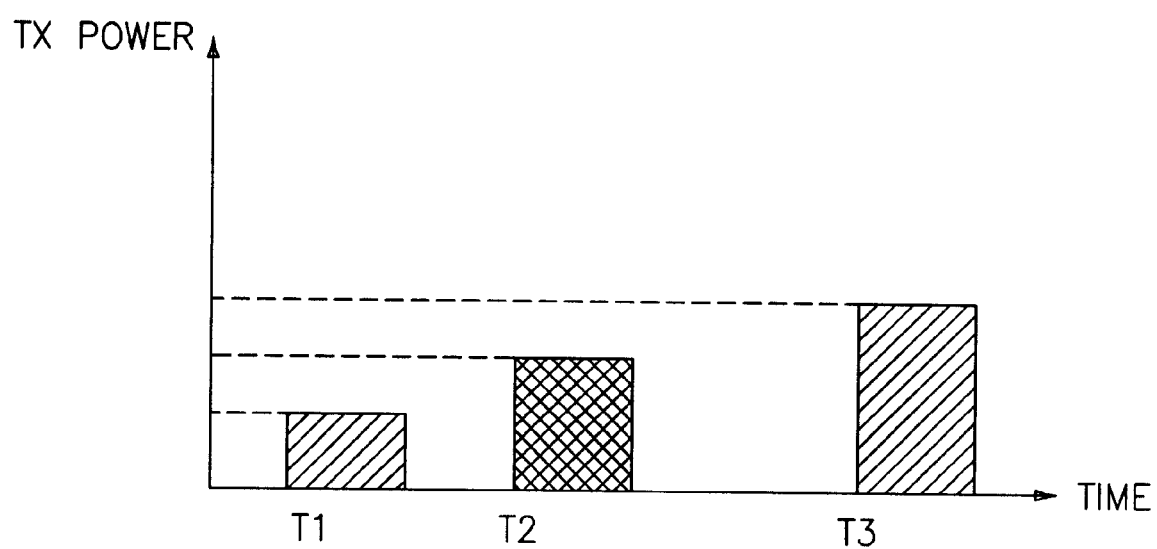
FIG. 1 is a diagram of a conventional power control method for a reverse common channel in a CDMA mobile communication system.

That is, as illustrated in FIG. 1, a preamble transmitter (not shown) sends a preamble signal at predetermined intervals which consist of a fixed time period added to a random time period, and increases the transmission power at each interval. Then, a first transmission power controller (i.e., the open-loop power controller) measures the strength of the signal received from the base station to generate the first transmission power control signal for controlling transmission power of the preamble signal. Further, a second transmission power controller (i.e., the closed-loop power controller) accumulates PCBs received over the forward common channel for a predetermined time to generate an accumulated PCB value and compares the accumulated PCB value with a threshold. As the result of comparison, when it is required to decrease the transmission power, the second transmission power controller generates a second transmission power control signal for decreasing the transmission power by a predetermined value. Otherwise, the second transmission power controller generates a second transmission power control signal for maintaining the present transmission power. The transmission power accumulator 415 accumulates the first transmission power control signal and the second transmission power control signal, and applies the accumulated signal to the preamble transmitter to control transmission power of the preamble signal.

As described above, the threshold used when the closed-loop power controller determines the second transmission power control signal is the maximum value permitted when the transmission power is increased in response to the power control command. The base station generates a power control command to decrease the transmission power of the preamble signal on the basis of the mobile station with the highest transmission power. Upon receipt of the power control command, all of the other mobile stations, but not the mobile station which attempted to access the base station with the highest transmission power, decrease the transmission power to the lowest extent. Therefore, it is possible to reduce interference due to excessive transmission power of the mobile stations which cannot access the base station.

Figure 3:
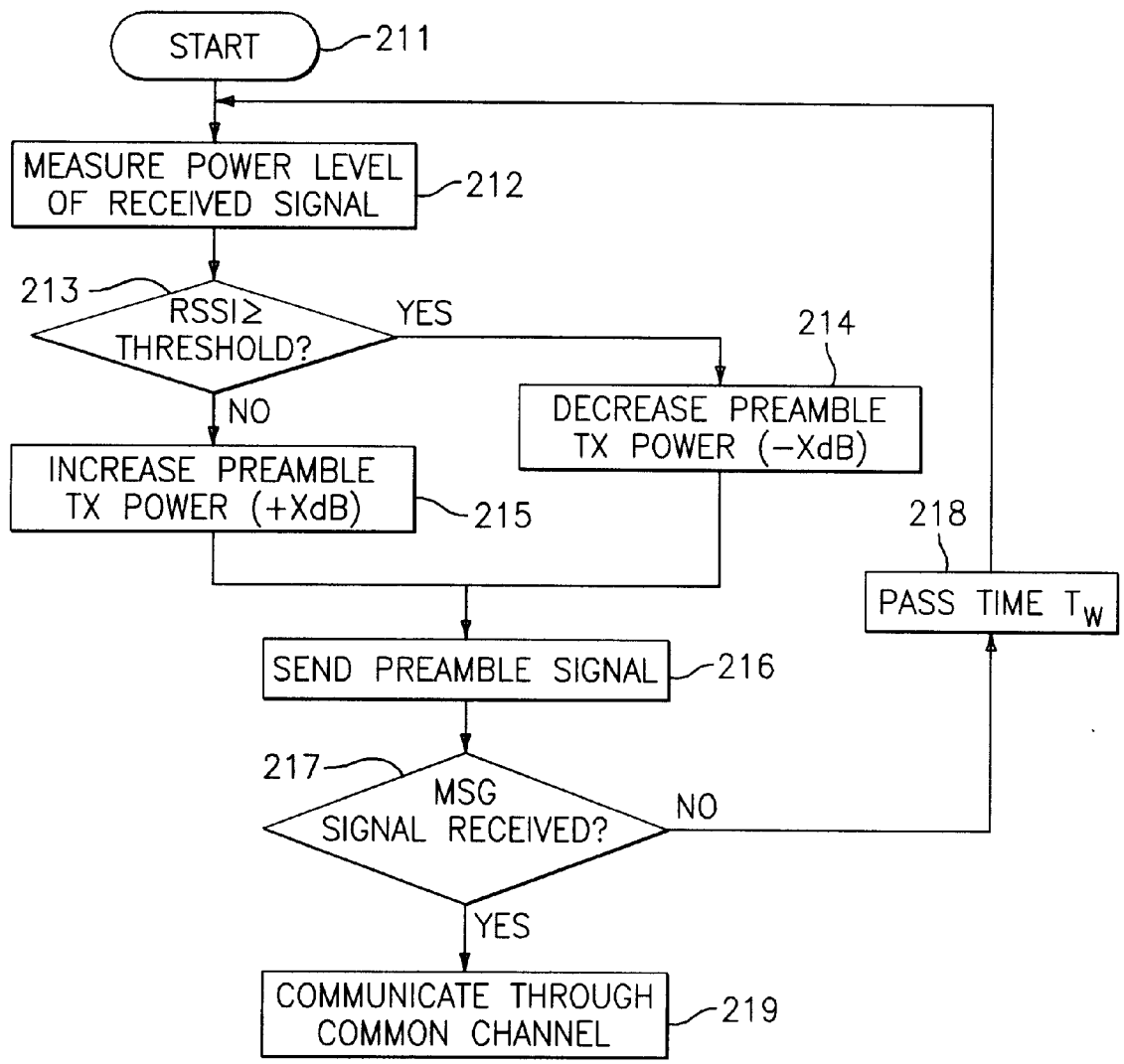
FIG. 3 is a flow chart illustrating an open-loop power control method for a reverse common channel in a CDMA mobile communication system.

FIG. 3 illustrates an open-loop power control method performed in the open loop power control (411–414) of FIG. 5.

Referring to FIG. 3, the open loop power control determiner measures strength, RSSI, of a signal received from a base station in step 212. Since a method for measuring the received signal strength is well known in the art, a detailed description will be avoided herein. After measuring the signal strength, the power control determiner compares the measured signal strength with a threshold in step 213. As the result of the comparison, when the received signal strength is lower than the threshold, transmission power of the mobile station is increased by a predetermined value (x dB) in step 215; otherwise, when the received signal strength is higher than the threshold, the transmission power of the mobile station is decreased by a predetermined value (x dB) in step 214.

After controlling the transmission power in steps 214 or 215, the power control determiner transmits a preamble signal to the base station in step 216, and determines in step 217 whether an acknowledge signal is received from the base station. Upon receipt of the acknowledge signal, the power control determiner communicate through the common channel and ends the procedure. However, upon failure to receive the acknowledge, the power control determiner passes a predetermined time $T_w$ in step 218 and then returns to step 212.

Figure 4:
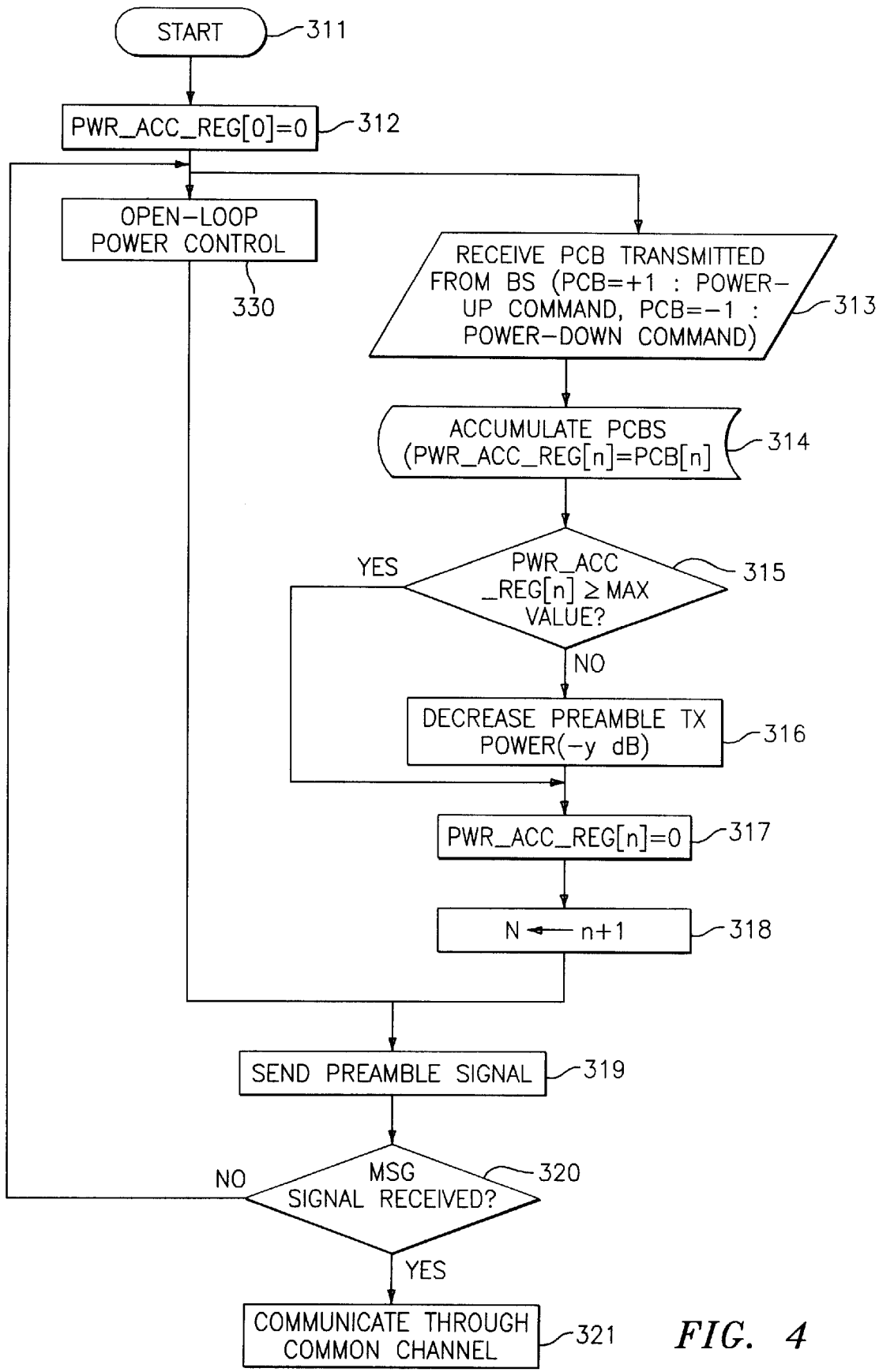
FIG. 4 is a flow chart illustrating a power control method for a reverse common channel using both open-loop power control and closed-loop power control in a CDMA mobile communication system according to an embodiment of the present invention.

FIG. 4 illustrates a power control method for a reverse common channel using both open-loop power control and closed-loop power control, performed in the power control determiner of FIG. 5.

Referring to FIG. 4, the power control determiner initializes a PCB accumulation register value PWR_ACC_REG to "0". Here, the open-loop power control procedure (211–214/5) of FIG. 3 is performed in step 330. That is, in step 330, the mobile station measures strength of a signal transmitted from a base station and compares the measured signal strength with a threshold. When the measured signal strength value is lower than the threshold, transmission power of a preamble signal is increased by a predetermined value (x dB); when the measured signal strength value is higher than the threshold, the transmission power of the preamble signal is decreased by a predetermined value (x dB).

With respect to a closed-loop power control procedure, the power control determiner receives a power control command (PCB) transmitted from the base station and determines whether it is a power-up command or a power-down command, in step 313. For example, the power control command value can be +1 for the power-up command, and −1 for the power-down command. Then the power control determiner accumulates the power control command values in step 314. The accumulated power control command value is compared with a maximum value in step 315. Here, the maximum value can be 0 or can be given as a system parameter. When the accumulated power control command value is greater than the maximum value, i.e., when it is required to increase transmission power of a preamble signal, the power control determiner maintains the present transmission power by jumping to step 317. However, when the accumulated power control command value is smaller than the maximum value, i.e., when it is required to decrease the transmission power of the preamble signal, the power control determiner decreases the transmission power of the preamble signal by a predetermined value (y dB) in step 316. After steps 315 and 316, the power control determiner initializes the PCB accumulation register value PVWR_ACC_REG in step 317 and increases a variable n by "1" in step 318.

The power control determiner increases or decreases the transmission power of the preamble signal according to the open-loop and closed-loop power control results, in step 319. That is, the power control determiner combines the signal determined by the open-loop power control procedure and the signal determined by the closed-loop power control procedure, to determine the transmission power of the reverse common channel.

In step 320, it is determined whether an acknowledge signal is received from the base station. Upon receipt of the acknowledge signal, the procedure goes to step 321 where communication is made through the common channel. However, upon failure to receive the acknowledge signal, the procedure returns to step 313. In this manner, when contention occurs among multiple mobile stations, it is possible to reduce rather than increase the interference which may occur during the closed-loop power control method.

In the meantime, for the method of transmitting a power control command from a base station to a mobile station, it is possible to use a forward link common sub-control channel in addition to the forward link common control channel. That is, the base station transmits a power control command using the separate sub-control channel to the mobile station. As another method for transmitting a power control command to the mobile station, the base station can puncture a paging channel or a forward common control channel in order to transmit the power control bit by inserting it in the punctured location. As further another method for transmitting a power control command to the mobile station, the base station can transmit the power control command as a separate message using the paging channel or the forward common control channel.

As described above, the power control method reduces the interference due to the excessive signal power on the reverse common channel which occurs when multiple mobile stations simultaneously attempt to access abase station on a contention basis, in a mobile communication system.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for controlling transmission power of a reverse common channel for a mobile station in a code division multiple access (CDMA) communication system, comprising the steps of:
   accumulating power control signals received for a predetermined time over a forward common channel to generate an accumulated value;
   comparing the accumulated value with a threshold;
   if the accumulated value is less than the threshold, generating a command to decrease the transmission power;
   if the accumulated value is greater than the threshold, maintaining the present transmission power.

2. The method as claimed in claim 1, said mobile station having a preamble signal which is transmitted over the reverse common channel, wherein said method further comprises the steps of discontinuing transmission of the preamble signal and accessing the reverse common channel, upon receipt of an acknowledge signal from the base station.

3. The method as claimed in claim 2, wherein the forward common channel is a forward common sub-control channel for transmitting a power control command exclusively.

4. The method as claimed in claim 2, wherein a base station measures the received power of the reverse link, generates a corresponding power control bit, inserts the power control bit in the forward common control channel at a predetermined location, and transmits the forward common control channel.

5. The method as claimed in claim 2, wherein the forward common channel is a forward common control channel for transmitting a power control command message generated by a base station for the reverse link common channel.

6. A method for controlling transmission power of a reverse common channel for a mobile station in a CDMA communication system in which the mobile station transmits a preamble signal at predetermined intervals with increasing transmission power and accesses a reverse common channel upon receipt of an acknowledge signal from a base station, the method comprising the steps of:
   measuring the strength of a received signal to generate a first transmission power control signal for the preamble signal;
   accumulating power control commands received for a predetermined time over a forward common channel to generate an accumulated value, comparing the accumulated value with a threshold, generating a second transmission power control signal for decreasing the transmission power when it is required to decrease the transmission power, and maintaining the present transmission power when it is required to increase the transmission power; and
   accumulating the first and second transmission power control signals and controlling the preamble signal according to the accumulated transmission power control signal.

7. The method as claimed in claim 6, wherein a threshold for determining the second transmission power control signal is a maximum value permitted when the transmission power is increased according to a power control command generated by the base station on the basis of the transmission power of a mobile station which attempts to access the base station with the highest transmission power.

8. The method as claimed in claim 7, further comprising the step of discontinuing transmission of the preamble signal and accessing the reverse common channel, upon receipt of an acknowledge signal from the base station.

9. A device for controlling transmission power of a reverse common channel for a mobile station in a CDMA communication system, the device comprising:

an accumulator for accumulating power control signals received for a predetermined time over a forward common channel, said accumulator generating an accumulated value in order to control the transmission power of the reverse common channel; and a power controller for comparing the accumulated value with a threshold, generating a power-down command when it is required to decrease the transmission power, and maintaining a present transmission power when it is required to increase the transmission power.

10. The device as claimed in claim 9, wherein a signal transmitted over the reverse common channel is a preamble signal.

11. The device as claimed in claim 9, wherein the forward common channel is a forward common sub-control channel for transmitting a power control command exclusively.

12. A device for controlling transmission power of a reverse common channel for a mobile station in a CDMA communication system, the device comprising:

a preamble signal transmitter for transmitting a preamble signal at predetermined intervals by increasing transmission power;

an open-loop power controller for measuring the strength of a received signal to generate a first transmission power control signal for the preamble signal;

a power controller for accumulating the power control commands received for a predetermined time over a forward common channel to generate an accumulated value, comparing the accumulated value with a threshold, and generating a second transmission power control signal for either decreasing the transmission power when it is required to decrease the transmission power, or maintaining the present transmission power when it is required to increase the transmission power; and an accumulator for accumulating the first and second transmission power control signals and applying the accumulated transmission power control signal to the preamble transmitter.

13. The device as claimed in claim 12, wherein a threshold for determining the second transmission power control signal is a maximum value permitted when the transmission power is increased according to a power control command generated by the base station on a basis of the transmission power of a mobile station which attempts to access the base station with the highest transmission power.

* * * * *